(12) United States Patent
Moriwaki et al.

(10) Patent No.: US 6,359,999 B1
(45) Date of Patent: Mar. 19, 2002

(54) METHOD OF ADDING INFORMATION TO VIDEO SIGNAL AND INFORMATION ADDING DEVICE

(75) Inventors: Hisayoshi Moriwaki; Takashi Kohashi, both of Tokyo; Yuji Kimura, Kanagawa; Akira Ogino; Nozomu Ikeda, both of Tokyo, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/151,272

(22) Filed: Sep. 11, 1998

(30) Foreign Application Priority Data

Sep. 17, 1997 (JP) ............................... 9-252176

(51) Int. Cl.[7] ............................ G06K 9/00; H04K 1/00; A61F 2/06; H04L 9/00
(52) U.S. Cl. ...................... 382/100; 380/287; 375/130; 713/176
(58) Field of Search ................................ 382/284, 250, 382/252, 100, 232; 375/240, 130, 131, 134, 137; 380/210, 252, 287, 54, 4, 51; 713/176

(56) References Cited

U.S. PATENT DOCUMENTS

| | | | |
|---|---|---|---|
| 5,650,858 A | * | 7/1997 | Lund ............................ 358/298 |
| 5,805,762 A | * | 9/1998 | Boyce et al. .................. 386/68 |
| 5,825,892 A | * | 10/1998 | Braudaway et al. ........... 380/51 |
| 5,848,155 A | * | 12/1998 | Cox ................................. 380/4 |
| 5,857,038 A | * | 1/1999 | Owada et al. ................ 382/284 |
| 5,901,178 A | * | 5/1999 | Lee et al. ..................... 375/240 |
| 5,903,593 A | * | 5/1999 | Ishiguro et al. .............. 375/200 |
| 5,949,885 A | * | 9/1999 | Leighton ....................... 380/54 |

FOREIGN PATENT DOCUMENTS

| | | |
|---|---|---|
| EP | 0360615 | 3/1990 |
| EP | 0778566 | 6/1997 |
| EP | 0838946 | 4/1998 |
| EP | 0843473 | 5/1998 |
| EP | 0848550 | 6/1998 |
| EP | 0848551 | 6/1998 |
| EP | 0849945 | 6/1998 |

* cited by examiner

Primary Examiner—Leo Boudreau
Assistant Examiner—Kanji Patel
(74) Attorney, Agent, or Firm—Jay H. Maioli

(57) ABSTRACT

When a spectrally spread additional information signal, obtained by spectrum spreading additional information such as an anti-duplication control signal or copyright information, is superimposed on a video signal, the level of the spectrally spread additional information signal is controlled according to the scatter of pixel values in each block comprising plural pixels. The sensitivity of detecting additional information from the spectrally spread additional information signal is therefore improved, and the visual effect of the spectrally spread additional information signal on a reproduced image is suppressed.

24 Claims, 11 Drawing Sheets

F I G. 1A
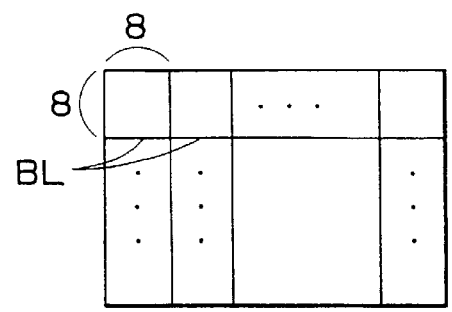
F I G. 1B
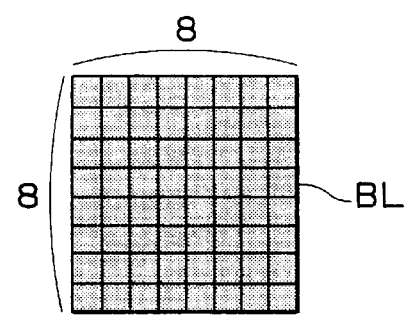
F I G. 1C
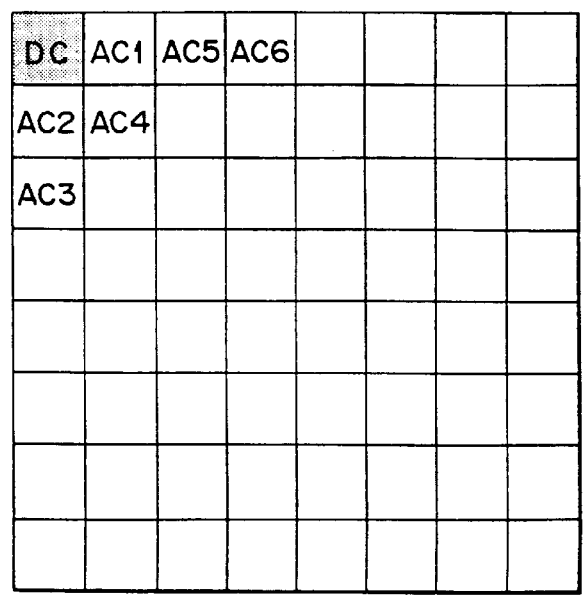

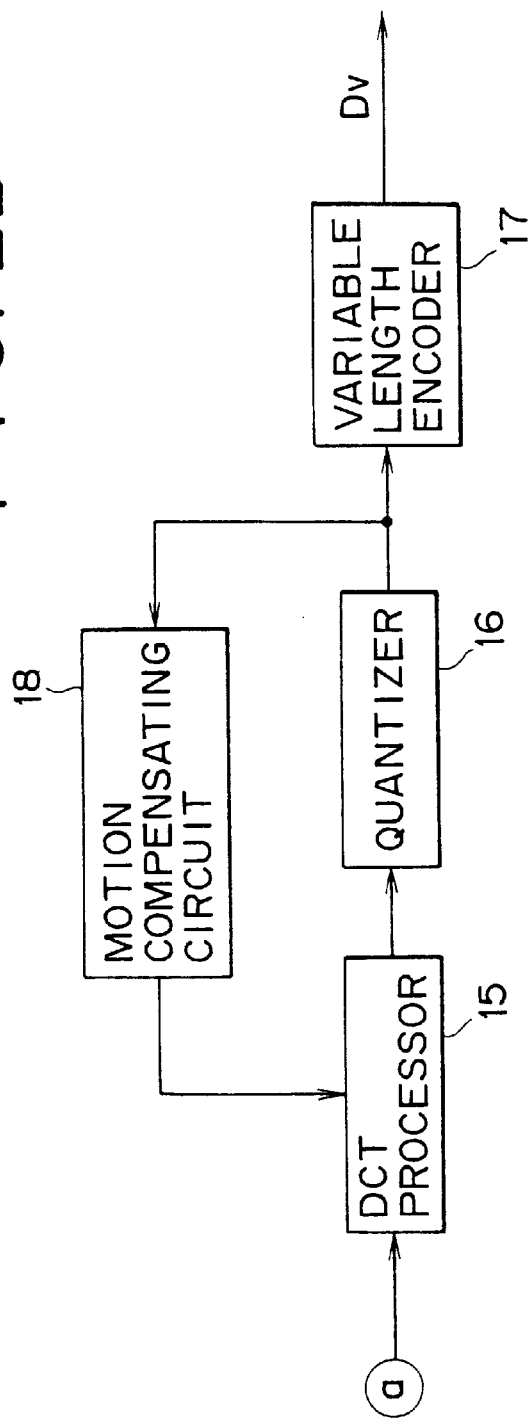
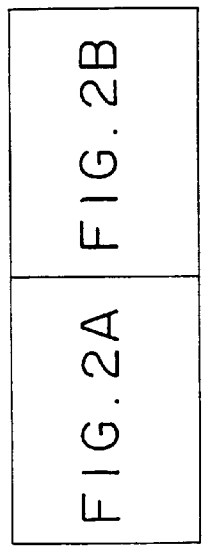

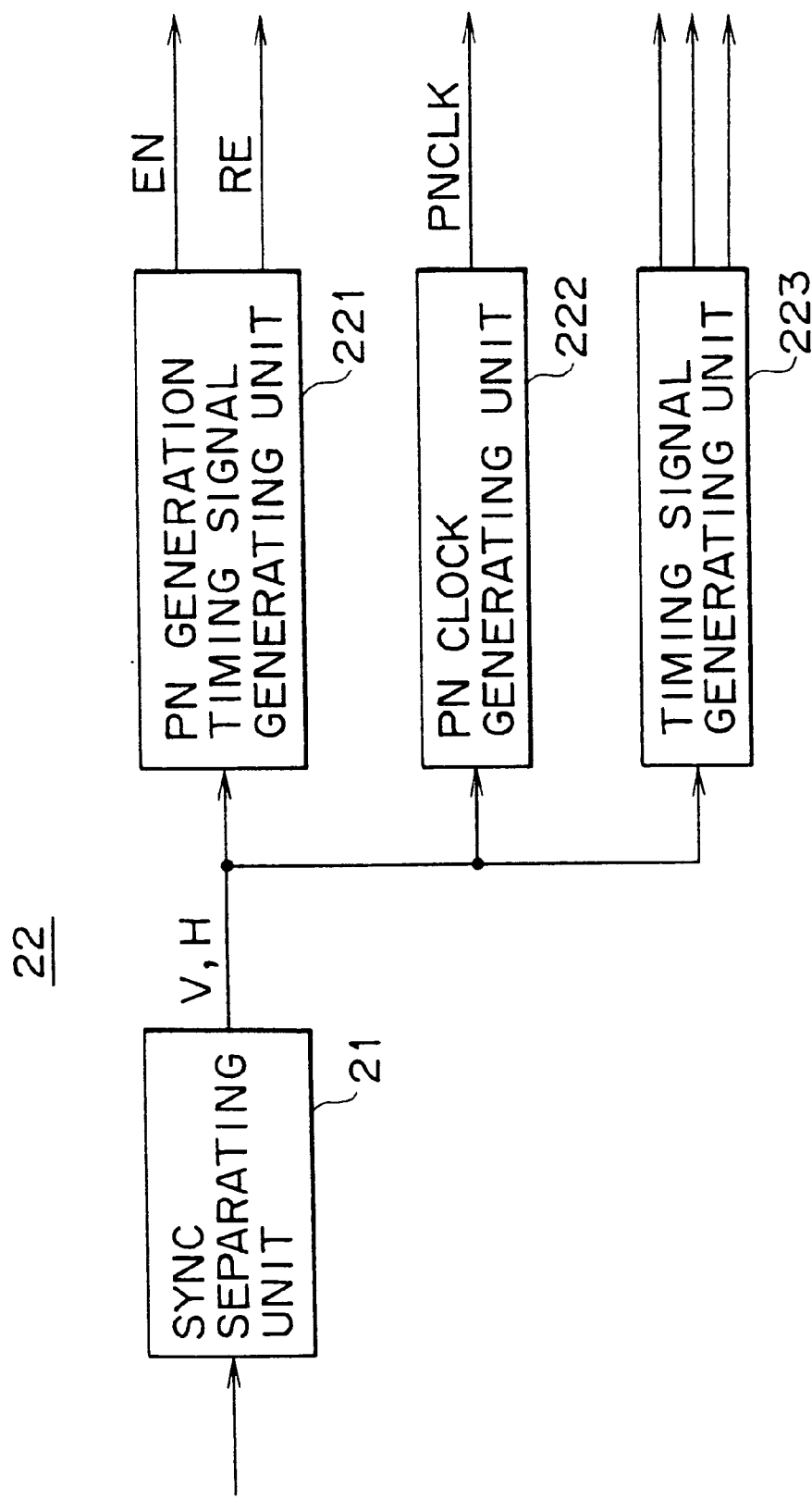

ANTI-DUPLICATION CONTROL SIGNAL SPECTRUM
BEFORE SPECTRUM SPREADING

ANTI-DUPLICATION CONTROL SIGNAL SPECTRUM
AFTER SPECTRUM SPREADING

SPECTRUM OF INFORMATION SIGNAL ON WHICH SS ANTI-DUPLICATION CONTROL SIGNAL IS SUPERIMPOSED

SIGNAL SPECTRUM AFTER SPECTRAL DESPREADING ON RECORDER SIDE

FIG. 6

| SCATTER | MULTIPLYING COEFFICIENT |
|---|---|
| 0 TO a | 1 |
| a TO b | 2 |
| b OR MORE | 3 |

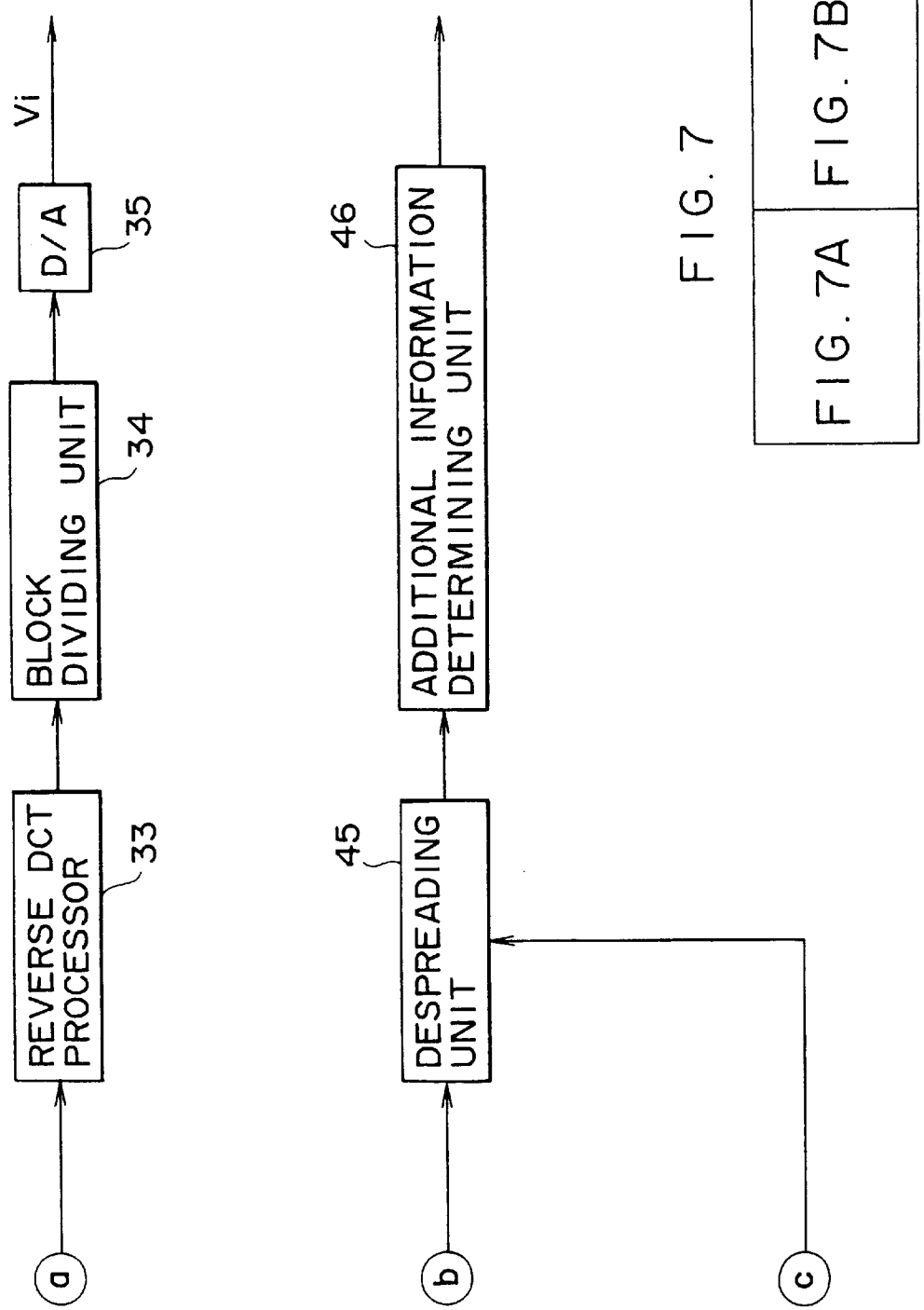

SCATTER

SUPERIMPOSING
LEVEL
MULTIPLYING
UNIT

METHOD OF ADDING INFORMATION TO VIDEO SIGNAL AND INFORMATION ADDING DEVICE

BACKGROUND OF THE INVENTION

1. Field of the Invention

The present invention relates to a method and device for adding information to an image signal, wherein the additional information is spectrally spread, superimposed at a very low level which has as little effect on a reproduced image as possible, and transmitted.

2. Description of Related Art

Devices for recording digital information, such as digital VTR and MD (mini-disc) record players, are in widespread use, and DVD (digital video disc or digital versatile disk) devices with recording functions have also appeared.

In these digital information recorders, various additional information signals can be recorded together with the main video and audio signals or computer data, etc. In this case, the additional information signal is a digital signal recorded on an area distinct from digital information signal areas, such as for example the headers added to every block of data or TOC (Table of Contents) area.

In the case of a system where additional information is transmitted by superimposing on a conventional main image signal, therefore, the additional information signal is not superimposed directly on digital information signals but is recorded on an indirect area as with headers. The additional information signal may therefore easily be lost by filtering or tampering, so that necessary additional information signals can no longer be detected by recording and playback devices. In particular, when control information and copyright information are added as additional information signals to prevent illegal duplication, their original purpose cannot be achieved due to the loss of the additional information signal.

Moreover, if the additional information signal is added to an indirect area, only the main information signal will be obtained when the digital information signal is converted to an analog signal and the additional information signal will be lost. This means that even if an anti-duplication control signal is added as an additional information signal to prevent illegal duplication, this strategy is completely ineffective when the signal is converted to an analog signal.

To resolve this problem of the disappearance of the additional information signal when the signal is converted to an analog signal, the inventors already proposed a method wherein an additional information signal such as an anti-duplication signal is spectrally spread, and the spectrally spread additional information signal is superimposed on an image signal during digital or analog recording.

In this method, spectrum spreading is performed by, for example, generating a code of a PN (Pseudorandom Noise) sequence (hereafter, referred to as a PN code) at a sufficiently early timing and applying it to the additional information signal. An additional information signal such as a narrow-band, high level anti-duplication control signal is thereby converted to a wideband, very low level signal which has no effect on the image signal. The additional information signal which has been spectrally spread in this way, i.e. the spectrally spread signal, is then superimposed on an analog image signal and recorded on a recording medium. The image signal recorded on the recording medium may be either analog or digital.

In this method, the additional information signal, such as an anti-duplication control signal, is superimposed with the same timing and frequency as the image signal. It is therefore difficult for a person who wishes to perform illegal duplication to remove the superimposed anti-duplication control signal from the image signal. However, the additional information signal such as a superimposed anti-duplication control signal can still be detected and used by performing despreading.

In this way, the anti-duplication control signal can be supplied together with the image signal to the recording side. On the recorder side, the anti-duplication control signal is detected, and anti-duplication control is performed without fail according to the detected anti-duplication control signal.

When the additional information superimposed on the image signal is reproduced, as described above, it is not removed from the signal, so it is necessary to superimpose the additional information at a minute level which does not affect the reproduced image of the image signal. However, it is important to be able to detect the spectrally spread signal from the main information signal even at a very low level, so it is desirable to increase the superimposing level as much as possible to lower the probability of incorrect detection.

Therefore, when the spectrally spread signal or additional information was superimposed on the image signal, either the effect on the reproduced image or the probability of incorrect detection had to be sacrificed to achieve an acceptable superimposing level.

SUMMARY OF THE INVENTION

The present invention therefore aims to provide a method and device for adding information which can satisfy both the requirements of decreased effect on the reproduced image and less probability of detecting the additional information incorrectly.

The present invention relates to a device for superimposing additional information, such as an anti-duplication control signal, on a video signal, generating a spectrum spreading code having chip intervals corresponding to blocks of plural pixels obtained by dividing one screen of the video signal into blocks in synchronism with the video signal, spectrum spreading the additional information by the spectrum spreading code to generate a spectrum spread additional information signal, calculating a scatter of pixel values contained in each block, generating a level control spectrum spread additional information signal for controlling the level of the spectrum spread additional information signal in a period corresponding to the aforesaid chip intervals according to the scatter, and superimposing the level control spectrum spread additional information signal on the video signal to generate an output video signal.

Human visual characteristics are such that when, for example, a minute amount of noise is superimposed on a flat image with little brightness variation, the noise is obvious, but in an image with sharp variation, the noise is not conspicuous even if it is added to the image.

In the present invention, when the image in a block is flat and there is little scatter, the superimposing level of this chip is set to a small value, whereas when the image in the block is a rapidly changing image with large scatter, the superimposing level of the block is set to a large value.

As the superimposing level of the spectrally spread signal can be increased according to scatter in this manner, although the superimposed additional information does not stand out, the probability of incorrect detection can be reduced.

That is, in the case of a flat image, the additional information superimposing amount decreases, but as described hereafter, for a flat image there is less correlation between the image and the spreading code, and as the detection sensitivity is high for this type of image as described later, the incorrect detection probability does not increase even if the superimposing level decreases. On the other hand for an image with large scatter, although the detection probability of the spectrally spread signal is poor as described hereafter, the superimposing level is set large and the superimposing amount is increased in the case of the present invention so that the detection sensitivity increases.

The relation between the scatter of the image and the detection sensitivity of the spectrally spread signal will now be described in more detail.

In the case of a signal Si comprising a spectrally spread signal superimposed on an image signal, an evaluation function φ for despreading when the spectrally spread signal is detected may be expressed as:

$$\phi = \Sigma si \cdot pi = \Sigma(Vi + ki \cdot pi)pi = \Sigma Vi \cdot pi + \Sigma ki \cdot pi \cdot pi \quad (1)$$

Vi is a main information signal such as an image signal, pi is a spreading code such as a PN code, and ki is a coefficient.

In equation (1), the first term shows the correlation between the main information signal, i.e. an image signal etc., and the spreading code, and the second term shows the correlation of the spectrally spread signal and the spreading code.

From equation (1), it is seen that if there is no or little correlation between the main in formation signal, i.e. the image signal and the spreading code, the sensitivity of detecting the spectrally spread signal is high; conversely, when there is a large correlation between the image signal and spreading code, the sensitivity of detecting the spectrally spread signal is low.

Writing the number of chips (=blocks) per screen as N, the dispersion (equivalent to scatter) of the image as $\sigma_v$, dispersion of the spreading code as $\sigma_p$ and the correlation function as γ, we have:

$$\gamma \approx (1/N) \cdot \Sigma Vi \cdot pi/(\sigma_v \cdot \sigma_p)$$

As $\sigma_p = 1$, $$\Sigma Vi \cdot pi \approx \gamma \cdot N \cdot \sigma_v$$

The first term in equation (1) is effectively directly proportional to the scatter $\sigma_v$ of the image part. Therefore if the scatter of the image part is small, there is little correlation between the image signal and spreading code, the first term of equation (1) becomes small, and the detection sensitivity is high. When on the other hand there is a large scatter of the image, there is a large correlation between the image signal and spreading code, the first term in equation (1) is large, and the detection sensitivity is low.

Therefore as described above, according to the invention of claim 1, the superimposing level per chip of the spectrally spread signal is increased in parts where the sensitivity of detecting the spectrally spread signal is low, and decreased in parts where the sensitivity of detecting the spectrally spread signal is high depending on the scatter in each block, so the probability of incorrectly detecting the additional information which is the spectrally spread signal is low. Moreover, by controlling the superimposing level in this way, the additional information is prevented from standing out on the image due to human visual characteristics as described above.

According to the invention of claim 2, in the method of adding information to an image signal as claimed in claim 1, the image signal in block units is further divided into sub-blocks, and the superimposing level of additional information is controlled taking account of the scatter in each sub-block.

According to the invention of claim 2, the scatter in sub-blocks is detected, and the scatter in a block is found from the scatter in sub-block units. Hence even if there is a large local scatter in a block, a suitable scatter can still be detected for each block.

According to the invention of claim 3, in the method of adding information to an image signal as claimed in claim 1, the image signal in block units is further divided into sub-blocks, and the superimposing level per chip of the spectrally spread signal of the additional information is controlled for each sub-block in a block according to the scatter in the sub-block.

According to the invention of claim 3, the superimposing level per chip is varied according to the scatter in each sub-block. Therefore, the additional information can be superimposed more finely so that it does not stand out on the image, and the additional information can be superimposed so as to reduce the likelihood of incorrect detection. Specifically, even when the superimposing level of additional information cannot be increased at the scatter in block units, it may be possible to increase the superimposing level in sub-block units, so the sensitivity of detecting the additional information is increased overall.

BRIEF DESCRIPTION OF THE DRAWINGS

FIGS. 1A to 1C are diagrams describing one embodiment of the information adding device according to the present invention.

FIG. 3 is a diagram showing an example of the construction of part of the device of FIG. 2.

FIG. 6 is a diagram describing the construction of part of the device of FIG. 2.

DETAILED DESCRIPTION OF THE PREFERRED EMBODIMENTS

Figure 2A:
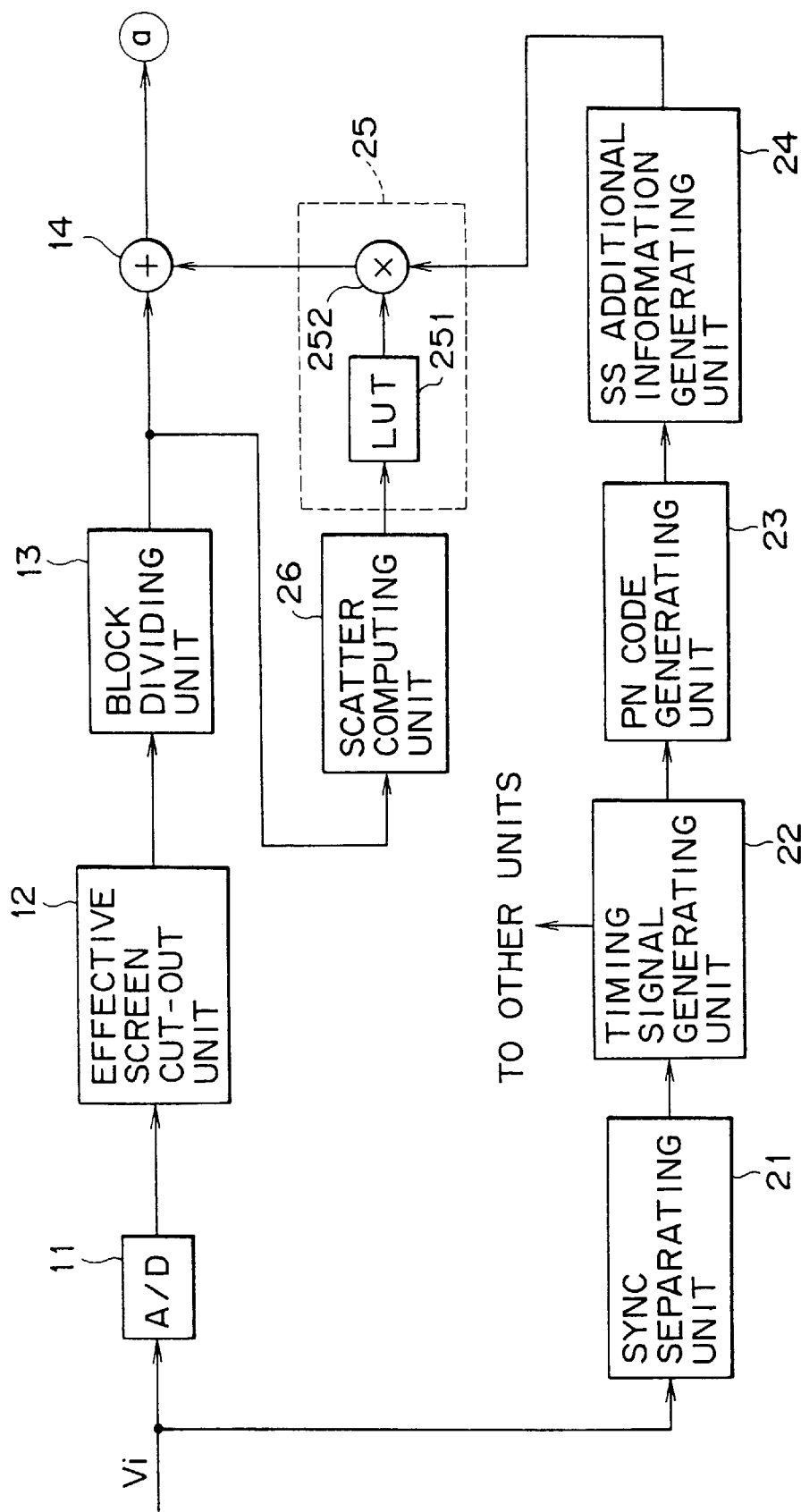
FIG. 2 is a block diagram showing an example of an additional information device to which an embodiment of the information adding device according to the present invention is applied.

Some embodiments of the method and device for adding additional information to an image signal according to this invention will be described referring to the drawings. The following embodiments describe the case where the image signal is a video signal, this video signal is digitally compressed by a compression technique using DCT (Discrete Cosine Transform) such as MPEG2, the compressed video signal is transmitted over a network or transmitted by recording on a recording medium, and additional information such as for example an anti-duplication control signal is spectrally spread and superimposed on the digital video signal.

In this embodiment, as shown in FIG. 1A, one screen (one frame or one field) of the video signal is divided into blocks BL in a rectangular area comprising for example 8 pixels (horizontal)×8 pixels (vertical), and compression by DCT is performed in these block units BL. The additional information is superimposed on the video signal as a spectrally spread signal by assigning one chip of a spreading code to one block BL.

According to this embodiment, the spectrally spread signal, which is the additional information, is superimposed on the video signal such that when the value of one chip of the spectrally spread signal is "0", the level (digital signal level) is positive, and when it is "1", the level (digital signal level) is negative. The superimposing level for one chip is set to a very low level at which there is no effect on the reproduced image from the video signal.

According to this embodiment, the additional information which is superimposed is an anti-duplication control signal, and it performs anti-duplication control on the transmitted video signal. This anti-duplication control signal may for example be a limiting signal which allows only first generation copies, or a signal which prohibits or permits duplication of the video signal, and it may comprise one or more bits.

In the following embodiment, the spectrum spreading code is superimposed on the brightness signal Y of the video signal, but is not superimposed on the color signal C. It may of course also be superimposed on the color signal C. However, the color signal of a video signal is transmitted by, for example, two phase axis components such as color difference signals and the color is reproduced by the phases of these two axes. Consequently, if the spectrally spread signal were superimposed on this color signal, there would be a change of hue even if the superimposed signal has a very low level so that the signal is relatively obvious. It is therefore difficult to superimpose the spectrally spread signal without affecting the hue. According to this embodiment, the spectrally spread signal is superimposed only on the brightness signal, however to simplify the description, the term "video signal" will be used without making any distinction between the brightness signal Y and the color signal C.

FIG. 2 is a block diagram which shows an example of the information adding device according to this embodiment. An input analog video signal Vi is converted to a digital signal in an A/D converter 11, supplied to an effective screen cut-out unit 12, and after the sync signal part is removed, supplied to a block dividing unit 13.

In the block dividing unit 13, each screen of the digital video signal is divided into 8 pixel (horizontal)×8 pixel (vertical) block BL units, as shown in FIG. 1A. The data in block BL units from this block dividing unit 13 is supplied to the superimposing unit 14 for superimposing additional information. The additional information comprising a spectrally spread signal is then supplied to this superimposing unit 14, and superimposed so that one chip of the spectrally spread signal is exactly assigned to the data in block BL units, as described hereafter.

The digital video signal on which the additional information from the superimposing unit 14 is superimposed is supplied to a DCT processor, and in this DCT processor 15, a DCT computation is performed on the data in block BL units so that the signal in a time base region is converted to DCT coefficients in a frequency region (FIGS. 1B and 1C).

The computation result from the DCT processor 15 is supplied to a quantizer 16 and quantized. The output from the quantizer 16 is supplied to the DCT processor 15 via a motion compensating circuit 18, and DCT computation of the motion component is performed. Specifically, in an intraframe which is referred to as a picture I, a DCT computation is performed in this frame, whereas in interframes such as a picture B or picture P, the difference between the previous and subsequent frames is taken and the difference is transmitted as data. However to reduce this difference as much as possible, the motion vector between frames is detected, and this motion component is also transmitted.

The output of the quantizer 16 is variable length encoded in a variable length encoder 17 using a Hufmann code, and output as an output signal Dv for recording transmission, for example.

The additional information is generated as a spectrally spread signal and superimposed in the following way. The input analog video signal Vi is supplied to a sync separating unit 21. This sync separating unit 21 separates a horizontal sync signal H and vertical sync signal V from the analog video signal Vi, and the separated horizontal sync signal H and vertical sync signal V are supplied to a timing signal unit 22.

The timing signal unit 22 digitizes the video signal and generates a timing signal for performing compression using the horizontal sync signal H and vertical sync signal V as reference signals. Also, as described below, the timing signal unit 22 generates a PN generation enable signal EN showing an interval for generating a PN code as a spreading code for generating a spectrally spread signal, a PN code reset timing signal RE (abbreviated hereafter as reset signal RE) showing a PN code generation start timing, and a PN clock signal PNCLK.

FIG. 3 is a block diagram for describing the timing signal unit 22. As shown in FIG. 3, the timing signal unit 22 comprises a PN generation timing signal generating unit 221, a PN clock generating unit 222 comprising a PLL, and a timing signal generating unit 223. The horizontal sync signal H and vertical sync signal V from the sync separating unit 21 are supplied to the PN generation timing signal generating unit 221 and timing signal generating unit 223, and the horizontal sync signal H from the sync separating unit 21 is supplied to the PN clock generating unit 222.

The PN generation timing signal generating unit 221, using the vertical sync signal V as a reference signal, generates the vertical sync reset signal RE for determining a repeat period of the spreading PN code sequence used for spectrum spreading. The PN generation timing signal generating unit 221 also generates the PN generation enable signal EN.

The PN clock generating unit 222, using the PLL circuit, generates the PN clock signal PNCLK which is synchronized with the horizontal sync signal H and has an image data period of a block BL unit. Specifically, the PN clock PNCLK is a clock signal having a period equal to the data in one block BL, which in this example is a period of 8×8=64 pixels. This PN clock PNCLK determines the chip period of the spreading code.

The timing signal generating unit 223, based on the vertical sync signal V and horizontal sync signal H, generates various timing signals used for digitization of the video signal and compression in the device of FIG. 2, as described hereabove. The timing signal from the timing signal generating unit 223 comprises a clock in image units.

The PN generation enable signal EN, reset signal RE and PN clock PNCLK from the timing signal unit 22 are supplied to a PN generating unit 23.

The PN generating unit 23 generates a PN code according to the clock signal PNCLK, enable signal EN and reset signal RE. Specifically, the PN generating unit 23 is reset by the reset signal RE in vertical period in this example, and generates a PN code sequence PS having a predetermined code pattern from its beginning. The PN generating unit 23 then generates a PN code sequence PS according to the clock signal PNCLK only when it is put into a PN code generation enable state by the enable signal EN.

Figure 4:
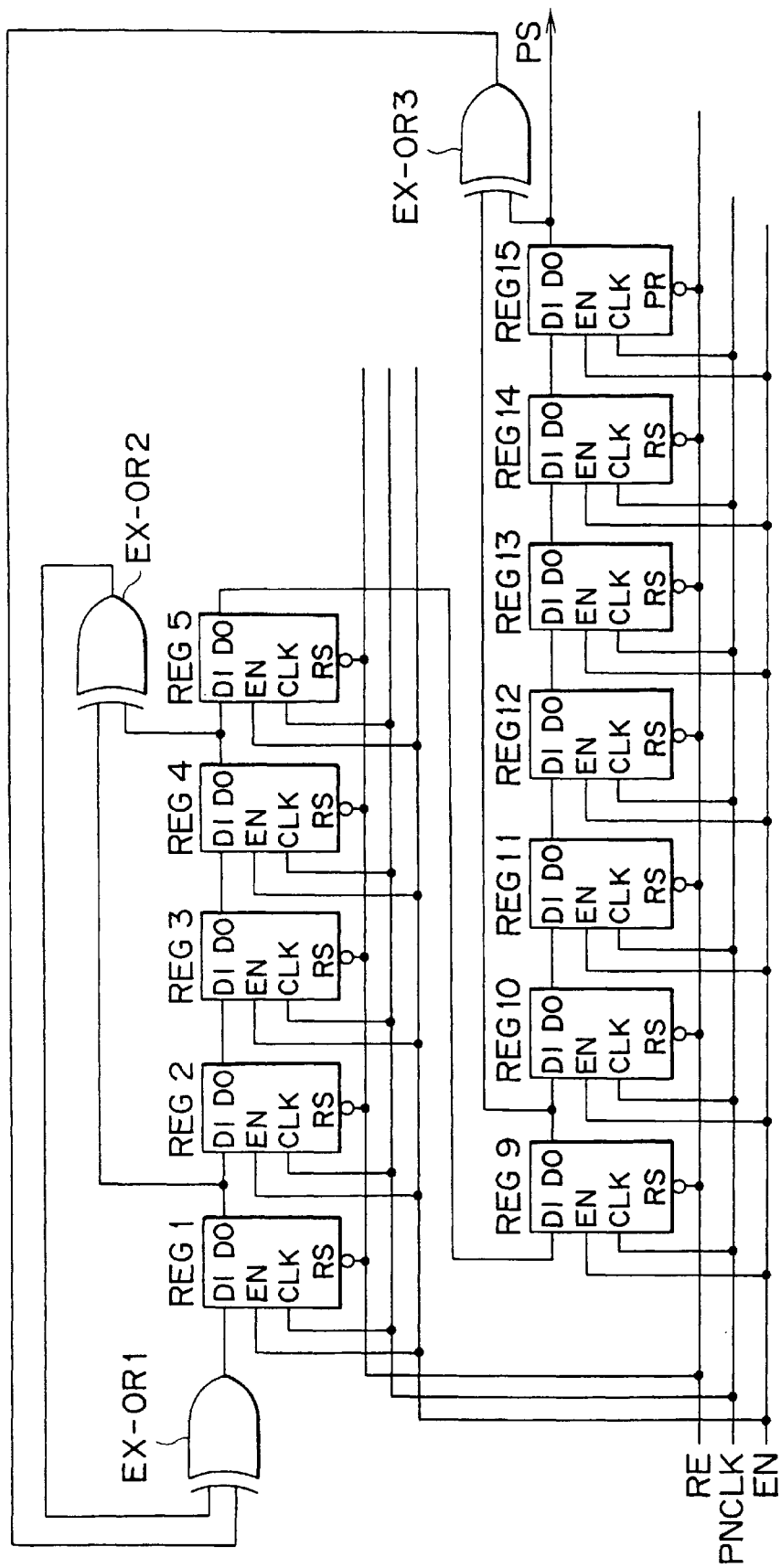
FIG. 4 is a diagram showing an example of the construction of part of the device of FIG. 2.

FIG. 4 shows an example of the construction of the PN generating unit 23. The PN generating unit 23 of this example comprises 15 D flip-flops REG1–REG15 forming a 15 stage shift register, and exclusive OR circuits EX-OR1–EX-OR3 which compute a suitable tap output of this shift register. The PN generating unit 23 shown in FIG. 4 generates M PN code sequences PS based on the enable signal EN, PN clock signal PNCLK and PN code reset timing signal RE.

The PN code sequences obtained in this way from the PN generating unit 23 are supplied to the SS (in the context of this specification, SS is an abbreviation for spectrum spread) additional information generating unit 24. The SS additional information generating unit 24 comprises a multiplier which multiplies the aforesaid anti-duplication control signal and PN code sequences PS from the PN generating unit 23, and generates an SS anti-duplication control signal as SS additional information. In this case, this anti-duplication control signal supplied by the SS additional information generating unit 24 or spectrally spread by this generating unit 24 has the same information bit content at least within one block BL.

The SS additional information generating unit 24 then supplies the generated SS anti-duplication control signal to the superimposing unit 14 via a superimposing level control unit 25.

In this case, the superimposing level control unit 25 outputs a digital level according to the value of one chip of the SS anti-duplication control signal. When the value of one chip of the SS anti-duplication control signal is "0", this is a very small positive level, and when the value of one chip of the SS anti-duplication control signal is "1", this is a very small negative level. These superimposing levels are variably controlled according to the scatter in every block BL.

To control the superimposing level in this superimposing level control unit 25, image data in block units from the block dividing unit 13 is supplied to a scatter computing unit 26, and the scatter of the brightness level in the block BL is computed. In this case, the scatter $\sigma_v$ is given by $$\sigma_v = \Sigma(Vi - Veven)^2/M \quad (2)$$

where the value of each pixel in the block is Vi and the average value of all pixels in the block is V even. Herein, M is the number of pixels in the block, and according to this embodiment, M=64. The scatter computing result from this scatter computing unit 26 is supplied to the superimposing level control unit 25.

The superimposing level control unit 25 comprises a lookup table 251 which stores a table of the correspondence between the scatter $\sigma_v$ in block BL units and a coefficient for determining the superimposing level, and a multiplying circuit 252 which is a superimposing level setting unit. The lookup table 251 may for example be of the type shown in FIG. 6. Specifically, when the scatter $\sigma_v$ satisfies the condition:

$$0 \leq \Sigma_v < a,$$

the value of the multiplying coefficient from the lookup table 251 is "1". When the scatter $\sigma_v$ satisfies the condition:

$$a \leq \sigma_v < b,$$

the value of the multiplying coefficient from the lookup table 251 is "2". When the scatter $\sigma_v$ satisfies the condition:

$$b \leq \sigma_v,$$

the value of the multiplying coefficient from the lookup table 251 is "3".

In the multiplying circuit 252, a preset very small positive or negative initial value according to the chip value "0" or "1" of the spectrally spread signal, is multiplied by the multiplying coefficient from the aforesaid lookup table 251. A spectrally spread signal which has a superimposing level according to the scatter of the image in each block is thereby obtained from the superimposing level control unit 25, and this is supplied to the superimposing unit 14 and superimposed on the image data in block units. That is, as shown by the shaded portion in FIG. 1B, a signal which is positive or negative according to the chip value, and having a level according to the scatter of pixel values in the block, is evenly superimposed on all pixels in one block BL.

For each block of the video signal, the additional information, i.e. each chip of the spectrally spread signal, is superimposed at a high superimposing level when there is a large scatter in a block and noise would not stand out even if superimposed, and is superimposed at a low level in flat parts where noise does stand out if superimposed. Therefore, the spectrally spread signal is superimposed on the video signal such that the superimposed additional information does not stand out, and such that an increased sensitivity of detecting the spectrally spread signal can be expected.

In this case, when the signal from the superimposing unit 14 is DCT converted, the additional information component of the superimposed spectrally spread signal will be concentrated in a coefficient DC which is the direct current component of all the DCT coefficients, as shown in FIG. 1C.

According to this embodiment, as described hereafter, the SS anti-duplication control signal superimposed as additional information can then be detected in the video signal by spectral despreading, extracting only the direct current component of the DCT coefficients, i.e. the coefficient DC, from the DCT coefficients prior to reverse DCT transformation.

When the transmitted video data is decoded and reverse DCT is performed, as the coefficient DC comprises the SS anti-duplication control signal, this SS anti-duplication control signal is decoded with almost no deterioration of the video signal. In the case of high frequency components, compression can cause loss of data, but the coefficient DC which is the direct current component is definitely present in the compressed signal. Therefore, the SS anti-duplication control signal is faithfully transmitted and anti-duplication control is faithfully performed.

Figure 5A:
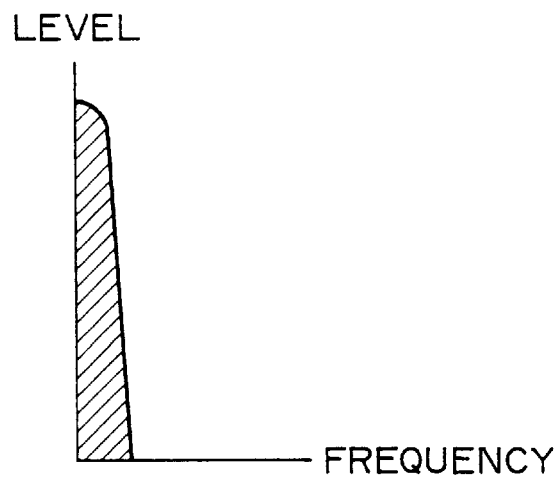
FIGS. 5A to 5D describe a relation between an information signal and a superimposing level of additional information which is a spectrally spread signal.
Figure 5B:
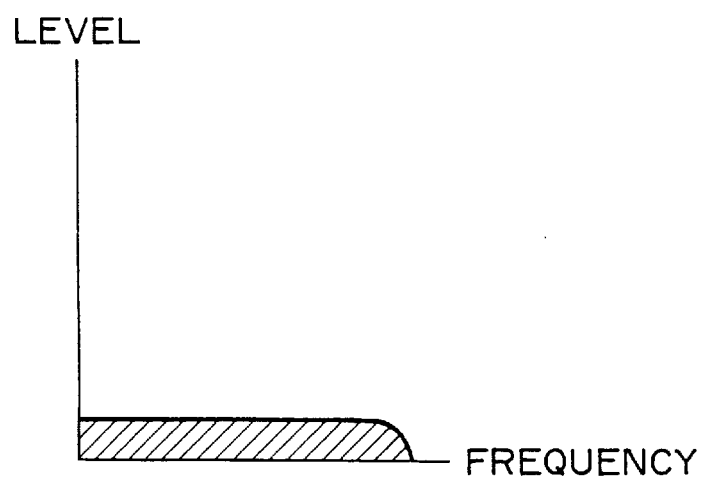

FIGS. 5A to 5D show the relation between the anti-duplication control signal and the video signal as a spectrum. The anti-duplication control signal is a low bit rate signal containing only a small amount of information, and it is a narrow-band signal as shown in FIG. 5A. When this is spectrally spread, it becomes a wideband signal as shown in FIG. 5B. The spectrally spread signal level decreases in inverse proportion to the bandwidth spreading ratio.

Figure 5C:
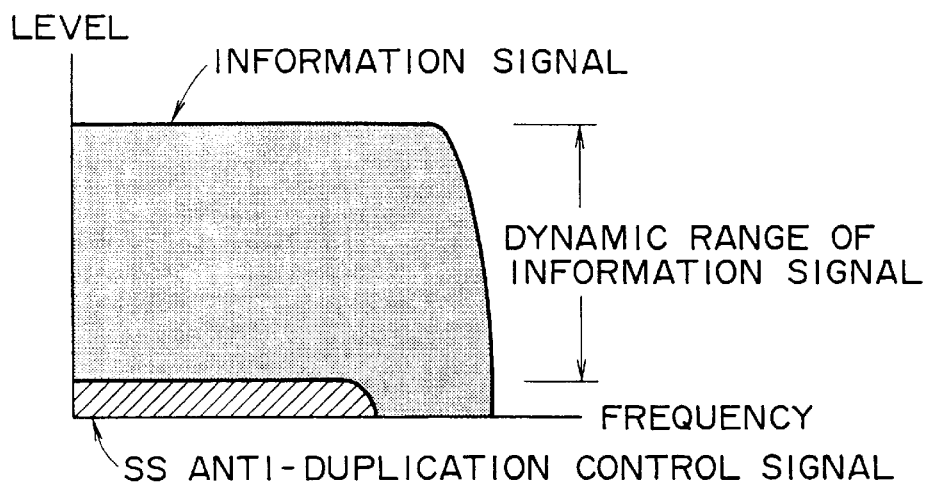

This spectrally spread signal is superimposed on the information signal by the superimposing unit 14, and in this process, the SS anti-duplication signal is superimposed at a smaller level than the dynamic range of the video signal which is the information signal, as shown in FIG. 5C. Hence, deterioration of a video signal or other information signal due to this superimposition can be almost completely prevented. When the video signal on which the spectrally spread signal is superimposed, is supplied to a monitor and the video signal is reproduced, the spectrally spread signal has almost no effect, and a good reproduced image is obtained.

Figure 5D:
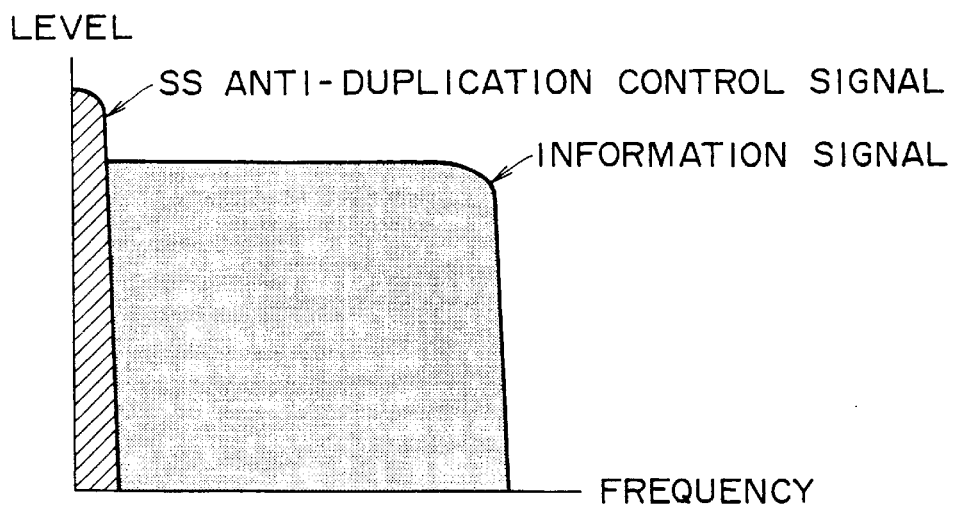

On the other hand, when spectral despreading is performed to detect the superimposed spectrally spread signal as described hereafter, the spectrally spread signal is restored as a narrow-band signal as shown in FIG. 5D. By providing a sufficient bandwidth spreading factor, the power of the additional information signal after despreading exceeds the power of the information signal, so it can be detected.

In this case, the additional information signal superimposed on the video signal, etc., has the same timing and frequency as the video signal, so deletion or modification by frequency filtering or simple substitution of information is impossible.

By superimposing the required additional information signal on the video signal and recording, it becomes attached to the video signal, and an additional information signal such as the aforesaid anti-duplication control signal can be transmitted without fail. Further, when the spectrally spread additional information signal is superimposed on the video signal or information signal at a lower signal power than the information signal, deterioration of the information signal can be minimized.

When for example an anti-duplication control signal is superimposed on the video signal as an additional information signal, it is difficult to tamper with or remove the anti-duplication signal, so this anti-duplication control definitively prevents illegal duplication.

Moreover, according to the above construction, spectrum spreading was performed using a PN code sequence having a vertical period based on the vertical sync signal. Hence, the PN code sequence for spectral despreading required to detect this spectrally spread signal from the video signal can easily be generated based on a signal synchronized with the vertical sync signal detected from the video signal. That is, it is unnecessary to perform synchronization control of the PN code for despreading, for example, with a sliding correlation device. As the PN code sequence for despreading can easily be generated in this way, despreading can be performed rapidly, and the anti-duplication control signal or other additional information which is spectrally spread and superimposed on the video signal, can be detected.

In the example of FIG. 2, the SS anti-duplication control signal was superimposed on a digital video signal, but it may also be superimposed on the analog video signal before A/D conversion such that one chip of the spectrally spread signal corresponds to plural pixels corresponding to data in block BL units.

Figure 7A:
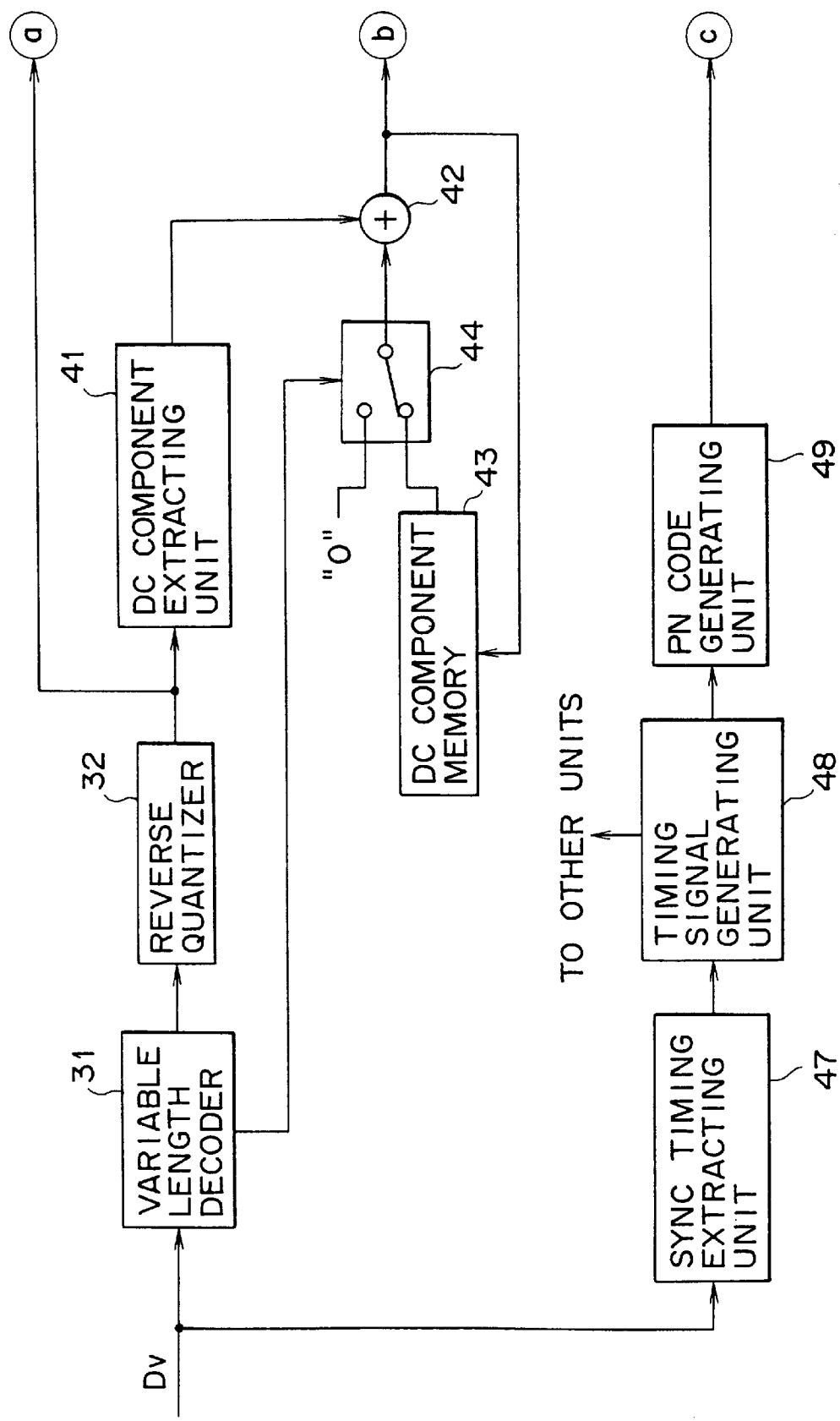
FIG. 7 is a block diagram showing an example of devices on an additional information detecting side to which an embodiment of the information superimposing and transmitting method according to the present invention is applied.

FIG. 7 shows one embodiment of a device which restores the original video data from a compressed video signal on which the SS additional information is superimposed, and detects an anti-duplication control signal which is the additional information.

As shown in FIG. 7, compressed video data Dv obtained by reading, for example, a DVD disk, is supplied to a variable length decoder 31 where it is decoded, and supplied to a reverse quantizer 32. By performing reverse quantization in the reverse quantizer 32, the data is restored to a bit stream comprising DCT coefficients. The data from this reverse quantizer 32 is supplied to a reverse DCT processor 33 which converts it from DCT coefficients in a frequency region to image data in a time region. The output from this reverse DCT processor 33 is supplied to a block dividing unit 34 which restores image data with the original time sequence from block BL unit data, and this is restored to analog video data by the D/A converter 35.

The detection of additional information is performed as follows for this example. The bit stream data comprising DCT coefficients from the reverse quantizer 32 is supplied to a direct current component extracting unit 41, and the coefficient DC which is the direct current component of the DCT coefficients, is extracted.

This coefficient DC is supplied to an adder 42 which integrates the difference between interframes such as picture B and picture P and extracts the correct data. The output signal of this adder 42 is temporarily stored in a direct current component memory 43. The direct current component memory 43 comprises a storage area for one frame in block units, and the recording region of each block unit is updated by a fresh output of a corresponding block from the adder 42. The direct current component output for each block from this direct current component memory 43 is supplied to one input terminal of a switching circuit 44. Also, zero ("0") is supplied as a direct current component to the other input terminal of the switching circuit 44.

This switching circuit 44 is changed over and controlled according to intraframe or interframe information contained in the header information in the input digital compressed data in the variable-length decoder. That is, when the data which is being decompressed is intraframe data, i.e. for the picture I, the switching circuit 44 is changed over to "0". The data in the blocks BL at that time is data which is concluded in the frame, and is data for a particular frame which has no difference from the preceding or subsequent frames.

On the other hand, when the data that is being decompressed is interframe data, the switching circuit 44 is changed over to the direct current component memory 43, a difference for each block is stored in the memory 43, the difference is added to the data of the following frame, and the correct data is restored.

As mentioned above, the direct current component of the restored DCT coefficients is supplied to the despreading unit 45. At the same time, the PN code sequence synchronized with the PN code on the superimposing side is supplied to the despreading unit 45, despreading is performed, and the additional information superimposed on the direct current component of the DCT coefficients is detected. In this case, as the superimposing level is increased in the direct current component of the DCT coefficients in block parts where the additional information, which is the spectrally spread signal, does not stand out on the reproduced image according to the scatter of the image as described earlier, the detection sensitivity in the despreading unit 45 increases, and the superimposed additional information can be detected without fail. The detected additional information is supplied to an additional information determining unit 46 where the bits of additional information are determined.

The PN code sequence for despreading is generated in synchronism with the superimposing side as follows. The compressed video signal data Dv is supplied to the sync timing extracting unit 47 to generate a sync timing signal. This sync timing signal comprises a block timing signal or a sync timing signal of data in frame units. The sync timing signal from this sync timing extracting unit 47 is supplied to a timing signal generating unit 48, where a timing signal such as a clock used in decompression and a timing signal for generating a spreading code for despreading, are generated.

The spreading code for despreading is generated by a PN generating unit 49. This PN generating unit 49 has the same construction as the PN generating unit shown in the aforesaid FIG. 4. The timing signal generating unit 48 generates the sync reset signal RE, ENABLE signal EN and clock signal PNCLK synchronized with the timing signal used on the SS additional information superimposing side, based on the sync timing signal from the sync timing extracting unit 47, and these are supplied to the PN generating unit 49.

A PN code sequence synchronized with the PN code sequence on the superimposing side is thereby generated by the PN generating unit 49. Due to the PN code sequence from this PN generating unit 49, the additional information is detected from the output signal of the adder 42 in the despreading unit 45.

Hence according to this embodiment, due to the anti-duplication control signal which was detected and determined as additional information, it can be detected whether or not duplication of bit stream, digital compressed video data is possible. If for example, duplication is prohibited, processing is performed to discard the bit stream data in the buffer without reading it.

If it is required only to detect additional information such as the anti-duplication control signal, the reverse DCT processor is unnecessary, so the additional information detecting device has a simpler construction and is more economical to produce.

For example, a DVD playback device or DVD recording/playback device comprises a MPEG decoder for restoring a MPEG2 compressed video signal to a time base signal, so despreading and detection of additional information are of course performed after performing DCT processing on the compressed video signal and restoring it to a time base video signal.

However, a DVD-ROM driver is not provided with a MPEG2 decoder, so MPEG decoding is performed in a personal computer connected to the DVD-ROM driver. In this case, effective anti-duplication control can be performed if illegal duplication is prevented prior to MPEG decoding.

If the additional information detecting device comprising the parts 31, 32, 41–49 in the aforesaid FIG. 7 is provided in a DVD-ROM driver, anti-duplication control and other processing may be performed on the bit stream data relatively cheaply without using a costly device such as a MPEG decoder, before it is assimilated by a personal computer.

The same effect is achieved if the additional information detecting device comprising the parts 31, 32, 41–49 in the aforesaid FIG. 7 is adaptively connected between the DVD driver and personal computer.

The additional information may of course be detected not from the direct current component of the DCT coefficients as described above, but from the data in block BL units from the reverse DCT processor 33.

Also, in the aforesaid embodiment, spectrum spreading was performed by a PN code sequence with a vertical period, and the adder 42 and direct current component memory 43 were provided to take account of the difference in interframes, but if the PN code sequence with vertical period is inverted with a frame period having a difference of 1 when the additional information is spectrally spread and superimposed, the adder 42 and direct current component memory 43 may be omitted.

In the aforesaid embodiment, the scatter computing unit 26 determined the scatter $\sigma_v$ by the aforesaid equation (2) for all the pixels in a block BL, using the average value of all the pixels in the block BL. However, the block BL may be further divided into sub-blocks, and the superimposing level per one chip of the spectrally spread signal in block units determined by taking account of scatter in these sub-block units.

Figure 8A:
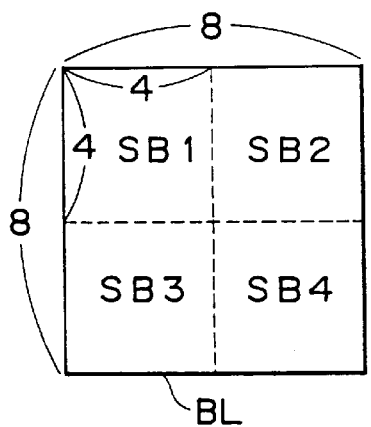
FIGS. 8A and 8B are diagrams describing another embodiment of this invention.
Figure 8B:
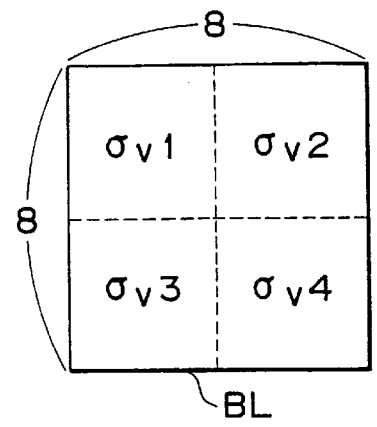

For example, as shown in FIG. 8A, a block BL comprising 8 (horizontal)×8 (vertical) pixels may be divided into four 4×4 sub-blocks SB1, SB2, SB3, SB4, and the scatters $\sigma_v 1$, $\sigma_v 2$, $\sigma_v 3$, $\sigma_v 4$ determined by the aforesaid equation (2) as shown in FIG. 8B. The scatter $\sigma_v$ of the block BL may be found by calculating, for example, the average of the scatter for each sub-block, i.e.

$$\sigma_v = (\sigma_v 1 + \sigma_v 2 + \sigma_v 3 + \sigma_v 4)/4,$$

and the superimposing level determined from the scatter of the block BL unit as in the aforesaid embodiment.

When the scatter in the block BL is determined from the scatter of the sub-blocks SB1, SB2, SB3, SB4 in this way, the superimposing level of the additional information is determined from more detailed image content information. The objects of this invention which are to make the additional information less conspicuous in the reproduced image and improve the detection sensitivity are therefore achieved more effectively.

Further, when blocks are divided into sub-blocks, the superimposing level of one chip of the spectrally spread signal is not fixed within the block BL but may be varied according to the scatter in the sub-blocks.

Figure 9A:
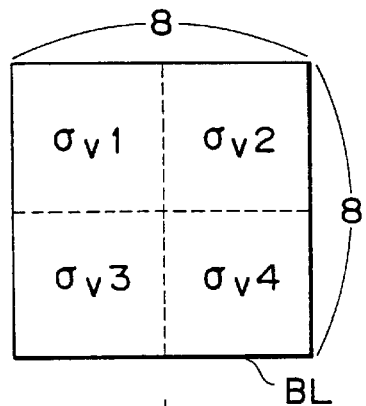
FIGS. 9A and 9B are diagrams describing another embodiment of this invention.
Figure 9B:
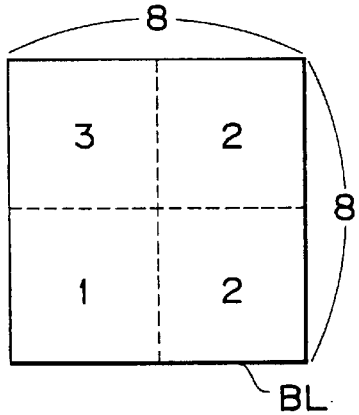

FIGS. 9A and 9B show an example of this. Specifically, in FIG. 9A, the block BL is divided into four sub-blocks SB1, SB2, SB3, SB4 as in the above example, and the scatters $\sigma_v 1$, $\sigma_v 2$, $\sigma_v 3$, $\sigma_v 4$ are determined by equation (2) for each sub-block SB1, SB2, SB3, SB4. The superimposing level for image data in each sub-block unit is then determined according to these scatters $\sigma_v 1$, $\sigma_v 2$, $\sigma_v 3$, $\sigma_v 4$.

In this case, there are two ways of setting the superimposing level in sub-block units. In one method, the lookup table 251 is looked up in sub-block units so as to vary the superimposing level.

In the other method, the scatter $\sigma_v$ in block units is calculated from the average of the scatters $\sigma_v 1$, $\sigma_v 2$, $\sigma_v 3$, $\sigma_v 4$ in sub-block units, the lookup table 251 is looked up according to this scatter $\sigma_v$, and coefficients (in the block) are allocated according to the scatters $\sigma_v 1$, $\sigma_v 2$, $\sigma_v 3$, $\sigma_v 4$ for each sub-block (so as to obtain the result from the lookup table).

The latter method is shown in FIG. 9B. For example, assume that, when a multiplying coefficient which is the result of referring to the lookup table from the scatter $\sigma_v$ in block units, is "2", the relation:

$$\sigma_v 1 < \sigma_v 2 < \sigma_v 4 < \sigma_v 3$$

holds for the scatters in the sub-blocks. Multiplying coefficients are then assigned to sub-block units as shown in FIG. 9B so that the multiplying coefficient for the block BL as a whole is "2".

In both methods, the superimposing level in one chip is not fixed, but varies in sub-block units. As a result, in the case of this embodiment, additional information is no longer contained only in the direct current component of the DCT coefficients, and detection of additional information is performed for data in block units after performing reverse DCT.

In the aforesaid description, the SS additional information was superimposed on the video signal with a correspondence of one chip to one block, however one chip may be assigned to one or more blocks. For example, the superimposing may be performed so that a macroblock of four blocks corresponds to one chip.

Also, the superimposing may be performed by assigning one chip not to one or more blocks where each block comprises plural pixels in both the horizontal and vertical directions, but to one or more blocks where each block comprises plural pixels in either the horizontal or vertical directions.

Further, this invention is not limited to the case where image data is compressed and transmitted, and may be applied to all cases where one chip of a spectrally spread signal is assigned to block units and superimposed.

Further, the reset period of the spreading code of the spectrally spread signal may not be one vertical period, but plural vertical periods. The reset period of the spreading code may also be one or more horizontal periods.

In the aforesaid embodiment, the superimposing level was set to either positive or negative according to "0" or "1" of the chip of the spreading code, but one level may be 0 level and the other either positive or negative. In this case, this invention may be applied by using the aforesaid fixed pattern superimposing level for either the positive or negative level.

Moreover, in the aforesaid description, the additional information signal which was spectrally spread and superimposed on the video signal was an anti-duplication control signal, however the additional information is not limited to an anti-duplication control signal, and may also be, for example, information related to the digital video signal, or for example a time code for identifying each field or copyright information, etc. As copyright information, a serial number specifying the recording device may for example be used. If this serial number is superimposed and recorded on the digital video signal Vi, it is easy to track the copying history.

In the aforesaid description, the spectrally spread signal was superimposed on a digital video signal, but it may of course be superimposed on an analog video signal in which case this invention can still be applied. Further, it may be applied not only to the case where additional information is superimposed as a spectrally spread signal on a video signal, but also to the case where it is superimposed on an image signal such as an image read from an image scanner.

Further, according to the above embodiment, the additional information bit was spectrally spread by a PN code, however different PN code sequences may be superimposed according to the additional information bits, and the spectrally spread signal detected by detecting these PN codes.

The invention may also be applied to the case where, for example, the PN code is superimposed on the video signal as a spectrally spread signal by defining that "1" is transmitted when the PN code is superimposed and "0" is transmitted when it is not superimposed.

Further, the spreading code is not limited to a PN code, but may also be another code such as a gold code.

Moreover, in the aforesaid description, the invention was applied to a recording and playback system, but it may be applied also to the case where additional information is superimposed on the video signal and transmitted by various media, for example radio waves, cables or infrared waves.

What is claimed:

1. A method for embedding information on a first signal, comprising the steps of:
    calculating a level of scatter of block values contained in each of a plurality of blocks of said first signal obtained by dividing said first signal into said blocks;
    generating a level controlled embedding signal having a signal level controlled based on said calculated level of scatter of block values, wherein said signal level is controlled using level controlling coefficients included in a lookup table and corresponding to ranges of levels of scatter of block values; and
    embedding said level controlled embedding signal on said first signal.

2. The method for embedding information on a first signal as claimed in claim 1, wherein said level of scatter of block values forms a first level of scatter and further comprising the step of calculating a second level of scatter of sub-block values contained in sub-blocks obtained by further dividing said blocks of said first signal and wherein said first level of scatter of said block values is calculated based on said second level of scatter of said sub-block values.

3. The method for embedding information on a first signal as claimed in claim 1, wherein said level of scatter is calculated using said block values, an average value of said block values, and a number of said block values contained in said blocks of said first signal.

4. A device for embedding information on a first signal, comprising:
    computing means for calculating a level of scatter of block values contained in each of a plurality of blocks of said first signal obtained by dividing said first signal into said blocks;
    level control means for generating a level controlled embedding signal having a signal level controlled based on said calculated level of scatter of block values, wherein said signal level is controlled using level controlling coefficients included in a lookup table and corresponding to ranges of levels of scatter of block values; and
    signal superimposing means for embedding said level controlled embedding signal on said first signal.

5. The device for embedding information on a first signal as claimed in claim 4, wherein said level of scatter of block values forms a first level of scatter and said computing means calculates a second level of scatter of sub-block values contained in sub-blocks obtained by further dividing said blocks of said first signal, and calculates said first level of scatter of said block values based on said second level of scatter of said sub-block values.

6. The device for embedding information on a first signal as claimed in claim 4, wherein said computing means calculates said level of scatter using said block values, an average value of block values, and a number of said block values contained in said blocks of said first signal.

7. The method for embedding information on a first signal as claimed in claim 2, wherein said step of generating a level controlled embedding signal comprises the steps of:
    deciding a first level controlling coefficient from said level controlling coefficients based on said first level of scatter;
    deciding second level controlling coefficients for use in controlling a level of said embedding signal to be embedded in said sub-blocks based on said first level controlling coefficient and said second level of scatter;
    controlling said level of said embedding signal using said second level controlling coefficient corresponding to each of said sub-blocks of said first signal.

8. The method for embedding information on a first signal as claimed in claim 1, wherein said first signal is a video signal, said blocks are blocks of plural pixels obtained by dividing one image of said video signal, and said block values are block pixel values contained in said blocks of said plural pixels.

9. The method for embedding information on a first signal as claimed in claim 1, wherein said embedding signal is produced from additional information indicating copyright information.

10. The method for embedding information on a first signal as claimed in claim 9, wherein said copyright information is a copy control information indicating a prohibition or a permission to duplicate said first signal.

11. The method for embedding information on a first signal as claimed in claim 1 further comprising the step of generating a code, wherein said embedding signal is generated using additional information and said code.

12. The method for embedding information on a first signal as claimed in claim 11, wherein said code is a spread code, and said embedded signal is generated by spreading said additional signal using said code.

13. The method for embedding information on a first signal as claimed in claim 12, wherein said embedded signal is generated by processing a spread spectrum process on said additional signal using said code.

14. The method for embedding information on a first signal as claimed in claim 11, wherein said code is a Pseudo Random Noise code.

15. The method for embedding information on a first signal as claimed in claim 11, wherein said code includes unit intervals corresponding to respective ones of said blocks of said first signal, said level controlled embedding signal is generated by controlling said signal level of said embedding signal in a period corresponding to said unit interval based on said first dispersion degree of the corresponding block of said first signal, and said level controlled embedding signal is embedded by embedding each of said periods of said level controlled embedding signal on corresponding blocks of said first signal.

16. The device for embedding information on a first signal as claimed in claim 5, wherein said level control means calculates a first level controlling coefficient from said level controlling coefficients based on said first level of scatter, calculates second level controlling coefficients for use in controlling a level of said embedding signal to be embedded in said sub-blocks based on said first level controlling coefficient and said second level of scatter, and controls said level of said embedding signal using said second level controlling coefficient corresponding to each of said sub-blocks of said first signal.

17. The device for embedding information on a first signal as claimed in claim 4, wherein said first signal is a video signal, said blocks are blocks of plural pixels obtained by dividing one image of said video signal, and said block values are block pixel values contained in said blocks of said plural pixels.

18. The device for embedding information on a first signal as claimed in claim 4, wherein said embedding signal is produced from additional information indicating copyright information.

19. The device for embedding information on a first signal as claimed in claim 18, wherein said copyright information is a copy control information indicating a prohibition or a permission to duplicate said first signal.

20. The device for embedding information on a first signal as claimed in claim 4, further comprising code generating means for generating a code, wherein said embedding signal is generated using additional information and said code.

21. The device for embedding information on a first signal as claimed in claim 20, wherein said code is a spread code, and said embedded signal is generated by spreading said additional signal using said code.

22. The device for embedding information on a first signal as claimed in claim 21, wherein said embedded signal is generated by processing a spread spectrum process on said additional signal using said code.

23. The device for embedding information on a first signal as claimed in claim 20, wherein said code is a Pseudo Random Noise code.

24. The device for embedding information on a first signal as claimed in claim 20, wherein said code includes unit intervals corresponding to respective ones of said blocks of said first signal, said level controlled embedding signal is generated by controlling said signal level of said embedding signal in a period corresponding to said unit interval based on said first level of scatter of the corresponding block of said first signal, and said level controlled embedding signal is embedded by embedding each of said periods of said level controlled embedding signal on corresponding blocks of said first signal.

* * * * *